Jan. 25, 1944.   J. K. HODNETTE   2,340,057
DISTRIBUTION TRANSFORMER FOR BANKING SERVICE
Filed Feb. 13, 1942
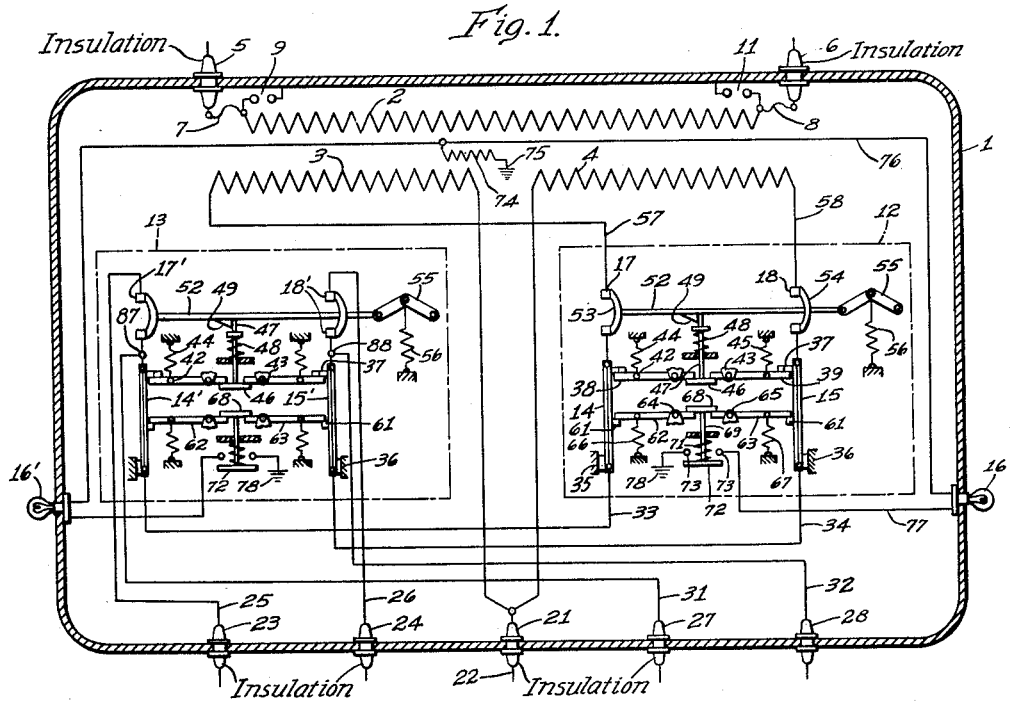
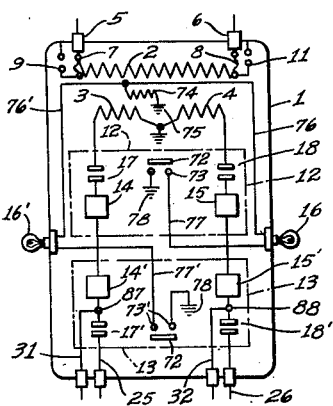
WITNESSES:
INVENTOR
John K. Hodnette.
BY
ATTORNEY Patented Jan. 25, 1944

2,340,057

UNITED STATES PATENT OFFICE 2,340,057

DISTRIBUTION TRANSFORMER FOR BANKING SERVICE

John K. Hodnette, Sharon, Pa., assignor to Westinghouse Electric & Manufacturing Company, East Pittsburgh, Pa., a corporation of Pennsylvania Application February 13, 1942, Serial No. 430,708

7 Claims. (Cl. 177—311)

My invention relates to distribution transformers and, more particularly, to such transformers arranged for banking service.

Some time ago the secondary network system of distribution was developed in order to improve the reliability of service and provide good voltage regulation in heavy density load areas. In such a system, a network of interconnected secondary circuits is supplied with electric energy from a plurality of feeder circuits each connected to the secondary network circuits through a plurality of transformers provided with network protectors. The network protector is controlled to disconnect the transformer secondary winding from the network circuit upon the reversal of power flow through the transformer which may be caused by a fault on the associated feeder, thus disconnecting the faulty feeder circuit from the network circuit. The network circuit then continues to receive energy from the remaining feeder circuits through the transformers connected to those circuits without interrupting the service supplied from the network circuit. If a fault occurs on the network circuit, all network protectors remain closed, and the fault is burned clear by the large currents available in the feeder circuits.

The network distribution system cannot be justified in many districts due to the expense involved. In many such areas, the load is supplied through an ordinary radial distribution system in which separate distribution circuit lines extend radially from a central source of energy. The radial system of distribution has limitations from the standpoint of continuity of service since the failure of a radial circuit interrupts the service to the loads supplied through that circuit.

In many places, where networks cannot be justified due to the expense involved, a better class of service is required than can be obtained from ordinary radial systems, such as the banking or interconnecting of the secondaries of transformers together to supply energy to the low voltage distribution circuit through a plurality of distribution transformers connected in parallel. In these applications it is usual to arrange the distribution transformers so that their primaries are all supplied from a single primary feeder, and each transformer unit is protected with some form of overcurrent device to disconnect it from the primary feeder in case of a fault on the unit. The secondary windings have also been connected through overcurrent devices, such as sectionalizing fuses, located in the distribution circuit near the center of load between the transformers. The distribution circuit supplied from the secondary windings is thus divided into sections which may be separated from one another by the sectionalizing fuses.

The sectionalizing fuses usually must be of low current rating to prevent transformer burnouts due to heavy loads on one section of the distribution circuit which must be supplied in part from the adjacent sections of the distribution circuit. It is also necessary that these fuses are of low current rating in order to prevent the burnout of transformers required to supply a section of the circuit adjacent to the section to which a particular transformer is directly connected when the fuse on the primary winding of the transformer normally supplying that section has been blown thus disconnecting the transformer from service.

When the sectionalizing fuses are of small capacity, a fault on one section causes the sectionalizing fuse to blow and separate the sections of the circuit from one another and thus to establish a radial system. Also if a primary fuse blows the sectionalizing fuses in the distribution circuit may blow due to the interflow of current between sections, thus again dividing the sections into a radially connected circuit system. These low capacity fuses may also blow due to momentary faults of short duration. The circuit may thus be broken up into separate sections operating as the usual radial system operates, thus losing the advantage of the banking of the transformers. In such systems, there is no reliable means for indicating that the primary or secondary fuses have blown.

When sectionalizing sections of large capacity are used, an individual transformer may burn out due to being required to supply too large an overload current to adjacent sections in addition to the load current supplied directly to the section to which the transformer is connected.

Another system of banking transformers that has been proposed is to provide primary fuses in circuit with the primary side of the transformer, and secondary fuses between the secondary transformer winding and the distribution circuit, without sectionalizing fuses between sections of the secondary circuit itself. This system does not offer adequate protection because if a fault occurs sufficient to cause the fuses in the primary or secondary of any transformer to blow, the additional load on the adjacent transformers will cause cascading or sequential blowing of fuses associated with the other transformers supplying the same circuit.

In accordance with the invention, a transformer is provided for use in a banking system that is so constructed and arranged as to overcome the above-named objections to the systems previously developed.

In the copending application of Royal C. Bergvall for improvements in Electrical distribution systems, filed August 9, 1941, Serial No. 406,136, now Patent No. 2,313,118, and assigned to the same assignee as this application, the system of electrical distribution is disclosed in which a distribution circuit is supplied with electrical energy from a plurality of sources each connected to the circuit through a main circuit breaker. The distribution circuit is provided with a plurality of sectionalizing circuit breakers for segregating portions of the distribution circuit connected to different sources of electric energy. The main and sectionalizing circuit breakers are arranged in groups each including one main circuit breaker, and one or more adjacent sectionalizing circuit breakers. The sectionalizing circuit breakers of each group are arranged to trip in advance of the tripping of the associated main circuit breaker. Consequently, the main circuit breaker remains closed unless the associated sectionalizing circuit breakers fail to clear the condition responsible for their tripping. The circuit breakers of each group are preferably controlled by a single variable quantity, such as the current supplied by the associated source of electrical energy.

It is an object of the present invention to provide a transformer for banking service for connection between a high voltage feeder circuit, and two or more low voltage distribution circuit portions, the transformer secondary being connected to one of the circuit portions through one circuit breaker only and to another of the circuit portions through two circuit breakers, the breakers being adjusted to operate in a predetermined sequence so that the first to trip segregates one circuit portion from the transformer without interrupting the supply of energy to the other circuit portion.

Other objects and advantages of the invention will be apparent from the following description of a preferred embodiment thereof, reference being had to the accompanying drawing, in which:

Figure 1 is a diagrammatic view of apparatus and circuits comprising one transformer unit;

Fig. 2 is a simplified diagrammatic view of the same transformer unit; and

Fig. 3 is a diagrammatic view of circuits illustrating the application of the transformer in a distribution system.

Referring to the drawing and particularly to Figs. 1 and 2 thereof, the transformer disclosed consists of a tank 1 enclosing a primary winding 2 and a secondary winding shown as having two portions 3 and 4. The primary winding is connected through bushings 5 and 6 to a source of electrical energy through circuit conductors including protective links 7 and 8 which are provided to disconnect the transformer from the high voltage circuit in case of a fault in the transformer itself. Arc discharge devices 9 and 11 are provided between the terminals of the winding 2 and the tank and are here illustrated diagrammatically as simple gaps, but it will be understood that they may comprise other conventional discharge gap devices, such as those described in my Patent No. 2,066,935, issued January 5, 1937. Mounted within the casing 1 are two circuit breakers indicated by the rectangles 12 and 13 shown in dot and dash lines. The main breaker 12 is connected to assure thermal protection to the transformer windings by interrupting the circuit connection between the transformer secondary and the discharge circuit. The circuit breaker 13 is an auxiliary or section circuit breaker for disconnecting one of the portions of the distribution circuit from the transformer upon a predetermined load on the transformer without tripping the main breaker. The two circuit breakers are essentially alike, each being subject to the control of thermal elements 14 and 15 and 14' and 15' connected in series in the two conductors leading from the secondary winding of the transformer. Each of the thermal elements is connected for tripping a plurality of latches, one of which controls a temperature indicating signal device, shown as lamps 16 and 16' to indicate overload on the transformer, and the other of which subsequently operates the associated breaker contact members 17 and 18 or 17' and 18' of the two breakers 12 and 13, respectively. It will be noted that five secondary bushings are employed, the bushing 21 accommodating the neutral line conductor 22 connected to the joined ends of the two secondary windings 3 and 4, and which is connected to the neutral of the system. The bushings 23 and 24 accommodate conductors 25 and 26, respectively, extending in one direction from the transformer comprising the section circuit conductors from that transformer, and the bushings 27, 28 accommodate the main circuit conductors 31 and 32 extending in the other direction from the transformer and comprising the main circuit conductors from that transformer. It will be noted by reference to Fig. 3 that those circuit conductors comprising the main circuit of one transformer of the system are the same as the conductors comprising the section circuit conductors of the next adjacent transformer in the series, except that the end transformer of the series, that is, the one shown to the extreme right in Fig. 3, is so connected that the dead end of the circuit is interrupted only by the main breaker. Whenever possible it is preferable to connect the two ends of the distribution circuit together to form a closed loop in which case the several transformers will all be similarly connected to the two circuit portions, there being no end section.

Referring to Fig. 1, the remaining parts of the breakers will be described in further detail, the description being directed particularly to the main breaker 12, the breaker 13 being shown for the purpose of illustration as identical in construction to the breaker 12 and the corresponding parts being indicated by the same numerals, as in the main breaker 12, except that the numerals are primed. It is not essential, in practice, that the breakers be identical in construction or that the actuating means be the same for both breakers. The bimetal elements 14 and 15 which are positioned in the transformer casing below the level of the cooling and insulating liquid constitute thermally actuated load-responsive elements for initiating the operation of the circuit breaker 12 to disconnect the transformer secondary winding from the circuit conductors 33 and 34. The bimetal elements 14 and 15 are mounted on suitable abutments 35 and 36, respectively, and are provided with latches 37 carried by their outer or moving ends that are adapted to disengage tripping members 38 and 39 pivotally mounted on pins 42, 43, respectively, and biased by springs 44 and 45. The ends of the tripping members 38 and 39 remote from the latches 37 are positioned adjacent to an operating member 46 attached to a latch rod 47 that is normally biased by spring 48 to its illustrated position to engage a projection 49 carried by a switch operating member 52 for maintaining the switch operating contact members 53 and 54 in circuit closing positions. Upon disengagement of the rod 47 with the projection 49, the circuit interrupting contact members 53 and 54 are actuated by the rod 52 and toggle mechanism 55 by spring 66. This may be brought about by heating either of the bimetal elements 14 or 15 sufficiently to release its associated latch 37 from engagement with the associated tripping members 38 or 39 so that should the output circuit from either of the conductors 57 or 58 increase above the desired value for which the equipment is set to operate, the breaker will be tripped.

For the purpose of controlling the energization of the signal light 16, additional tripping means is provided which may also be operated by the latches 37, but for purposes of clearer illustration are here indicated as being tripped by separate latches 61 which are so arranged as to be adapted to disengage tripping members 62 and 63 that are pivotally mounted on pivot pins 64 and 65, respectively, and biased by springs 66 and 67. The ends of the tripping members 62 and 63 that are remote from the latches 61 are positioned adjacent to an operating member 68 attached to a switch operating rod 69 normally biased by a spring 71 to its illustrated position to hold the switch contact member 72 in a circuit interrupting position. Upon disengagement of the latch 61 associated with either the bimetal 14 or the bimetal 15, the operating member 68 will be moved to cause the switch contact member 72 to close a circuit through contact members 73, thus energizing the lamp 16 through a circuit receiving energy from a winding 74, shown as inductively related to the primary winding 2 and having one terminal grounded at 75. This circuit extends through conductor 76 to the lamp 16, conductor 77, the switch contact members 73 and 72, to ground at 78.

The circuit breaker devices 12 and 13 and the control mechanism therefor that is actuated in response to the bimetal elements 14 and 15 may correspond to the circuit breaker disclosed in United States Patent No. 2,169,586 issued to M. G. Leonard, August 15, 1939, and assigned to the same assignee as this application. Such a circuit breaker is mounted to operate under the oil in which the transformer is immersed so that the bimetal elements 14 and 15 are responsive both to the temperature of the apparatus as a whole, as indicated by the oil temperature, and also to the current flowing in the secondary circuit.

The circuit breaker devices may be so adjusted that the signal device 16 will be energized by closing the circuit through contact member 73 prior to the heating of the bimetal elements sufficiently to trip the breaker and interrupt the circuit through contact members 17 and 18. The signal light is thereby used both to indicate overload and also operation of the breaker to disconnect the unit from the system. The section breaker 13 is so adjusted as to open at a lesser amount of heating than the main breaker 12.

Referring particularly to Fig. 3, in which a plurality of transformers 81, 82, 83, 84, 85 corresponding to that shown in Figs. 1 and 2 are connected between a feeder circuit comprising conductors 86 and a secondary circuit comprising the several section portions and main circuit portions from each transformer, it will be readily appreciated that the bimetal elements 14 and 14' and the bimetal elements 15 and 15' of the two breakers 12 and 13, are respectively, connected in series with the low voltage transformer winding. All of the bimetal elements are, therefore, responsive to the entire output current from the transformer, the section circuit being separated from the main circuit at junction points 87 and 88 which lie between the bimetal elements 14' and 15' and the breaker switch contact members 17' and 18' of the section breaker 13. It will be appreciated that thermal elements responsive to transformer temperature other than the bimetal elements 14 and 15, and 14' and 15' may be used.

In accordance with the invention, the section breaker 13 is adjusted to trip at a current through the low voltage winding that is slightly less than that required to trip the main breaker 12. In case of a fault, therefore, the section breakers on either side of the faulted distribution circuit section will trip first, and the main breaker feeding the adjacent sections of the distribution circuit will trip last, thereby isolating the faulted section from the remaining sections of the secondary circuit. Secondary dead-end circuits, such as the conductors 31 and 32, leading from the end transformer 85 should be connected to the main circuit so as to be interrupted only when the main circuit breaker 12 operates so that a fault occurring in the secondary circuit between the transformers 84 and 85, the last two transformers of the series, will not also cause a loss of service on the end section.

It will be apparent from the above description that the invention provides for the protection of transformers against burnout caused by too great overloads thereon by the operation of thermal devices responsive to the transformer temperatures. The invention maintains the connection between the separate sections of the distribution circuit intact until a transformer subject to overload has reached its maximum overload capacity as determined by heating. The interruption of the connections between adjacent sections is dependent upon the condition of the individual transformers normally supplying the several sections. Positive signalling is provided for indicating when a sectionalizing breaker has tripped or is about to trip and also a positive indication is given when the main breaker has tripped or is about to trip to remove the transformer from service. The thermally responsive breakers are operated in accordance with transformer temperatures and may, therefore, operate in the case of reverse power flow through the transformers as well as in the case of direct power flow therethrough.

It will be apparent to those skilled in the art that modifications in the circuits and arrangement of parts may be made within the spirit of my invention, and I do not wish to be limited otherwise than by the scope of the appended claims.

I claim as my invention:

1. In combination, an electrical transformer comprising a casing, a primary winding and a secondary winding within the casing, circuit conductors leading from said secondary winding to junction points and extending through the casing conductors leading from said junction points and extending through the casing to a main distribution circuit exterior to the transformer casing, and section circuit conductors leading from said junction points and extending through the casing to a section circuit exterior to the transformer casing, a section circuit breaker within the casing for disconnecting said section circuit conductors from said junction points, and a main circuit breaker within the casing for disconnecting the circuit between said secondary winding and said junction points, means responsive to the current flowing in any of said conductors between said secondary winding and said junction points for operating said section circuit breaker, and means responsive to the current flowing in any of said conductors between said secondary winding and said junction points for operating said main circuit breaker.

2. In combination, an electrical transformer comprising a casing, a primary and a secondary winding within the casing, a main circuit including two conductors leading from said secondary winding, and a branch section circuit including two conductors leading from said main circuit conductors, a section circuit breaker within said casing for disconnecting said section circuit conductors from said main circuit conductors, a main circuit breaker within said casing for disconnecting said main circuit conductors from said secondary winding, means responsive to a condition of the transformer comprising thermal means responsive to the current in each of said main circuit conductors for operating said section circuit breaker upon a certain predetermined intensity of said condition of the transformer, and means responsive to a condition of the transformer comprising thermal means responsive to the current in each of said two main circuit conductors for operating said main circuit breaker upon a greater predetermined intensity of said condition of the transformer.

3. In combination, an electrical transformer comprising a casing, a primary and a secondary winding within the casing, a main load circuit comprising a plurality of conductors leading from said secondary winding, and a branch section circuit comprising a plurality of conductors leading from said main circuit conductors, a multi-pole section circuit breaker within said casing for disconnecting said section circuit conductors from said main circuit conductors, a multi-pole main circuit breaker within said casing for disconnecting said main circuit conductors from said secondary winding, means responsive to a condition of the transformer comprising thermal means responsive to the current in each of said main circuit conductors for operating said section circuit breaker upon a certain predetermined intensity of said condition of the transformer, and means responsive to said condition of the transformer comprising thermal means responsive to the current in each of said main circuit conductors for operating said main circuit breaker upon a greater predetermined intensity of said condition of the transformer, and signal means associated with each of said circuit breakers operative upon the approach of the condition of the transformer to the intensity at which the circuit breaker operates for indicating the transformer condition said several signal and circuit breaker means being so coordinated that, as the said condition of the transformer progressively increases in intensity, the signal means associated with the section breaker will first operate, the section breaker will next operate, the signal means associated with the main breaker will next operate, and the main breaker will next operate.

4. In combination, an electrical transformer comprising a casing, a primary and a secondary winding within the casing, a main load circuit comprising a plurality of conductors leading from said secondary winding, and a branch section circuit comprising a plurality of conductors leading from said main circuit conductors, a multi-pole section circuit breaker within said casing for disconnecting said section circuit conductors from said main circuit conductors, a multi-pole main circuit breaker within said casing for disconnecting said main circuit conductors from said secondary winding, means responsive to a condition of the transformer for operating said section circuit breaker upon a certain predetermined intensity of said condition of the transformer, and means responsive to a condition of the transformer for operating said main circuit breaker upon a greater predetermined intensity of said condition of the transformer, separate signal means associated with each of said circuit breakers, and latch means controlled by the means for operating each breaker for effecting operation of said signal means for indicating a desired intensity of the said condition of the transformer said several signal and circuit breaker means being so coordinated that, as the said condition of the transformer progressively increases in intensity, the signal means associated with the section breaker will first operate, the section breaker will next operate, the signal means associated with the main breaker will next operate, and the main breaker will next operate.

5. In combination, an electrical transformer comprising a casing, a primary and a secondary winding within the casing, a main load circuit comprising a plurality of conductors leading from said secondary winding, and a branch section circuit comprising a plurality of conductors leading from said main circuit conductors, a multipole section circuit breaker within said casing, signal means associated with said section circuit breaker, thermal means responsive to a condition of the transformer including thermal means responsive to the current in each of said main circuit conductors, two tripping elements operated by said thermal means for separately controlling the operation of said signal means and the operation of said section circuit breaker, respectively, a multi-pole main circuit breaker within the casing, signal means associated with said main circuit breaker, additional thermal means responsive to a condition of the transformer including thermal means responsive to the current in each of said main circuit conductors, two tripping elements operated by said thermal means, one for controlling the operation of said signal means and one for controlling the operation of said main circuit breaker.

6. In combination, an electrical transformer comprising a casing, a liquid dielectric therein, a primary and a secondary winding within the casing immersed in said liquid dielectric, a main load circuit comprising a plurality of conductors leading from said secondary winding, and a branch section circuit comprising a plurality of conductors leading from said main circuit conductors, a multipole section circuit breaker within said casing for disconnecting said section circuit conductors from said main circuit conductors, a multipole main circuit breaker within said casing for disconnecting said main circuit conductors from said secondary winding, means responsive to a condition of the transformer comprising thermal means immersed in said liquid dielectric and responsive both to the temperature of said dielectric and to the current flowing in each of said main circuit conductors for operating said section circuit breaker upon a predetermined intensity of said condition of the transformer, and means responsive to said condition of the transformer comprising thermal means responsive both to the temperature of said liquid dielectric and the current in each of said main circuit conductors for operating said main circuit breaker upon a greater predetermined intensity of said condition of the transformer.

7. In combination, an electrical transformer comprising a casing, a primary and a secondary winding within the casing, a main load circuit comprising a plurality of conductors leading from said secondary winding, and a branch section circuit comprising a plurality of conductors leading from said main circuit conductors, a multipole section circuit breaker within said casing for disconnecting said section circuit conductors from said main circuit conductors, a multipole main circuit breaker within said casing for disconnecting said main circuit conductors from said secondary winding, means responsive to a condition of the transformer comprising separate thermal means responsive to the current flowing in the respective conductors of said main circuit for operating said section circuit breaker upon a certain predetermined intensity of said condition of the transformer, and means responsive to said condition of the transformer comprising separate thermal means responsive to the current flowing in the respective conductors of said main circuit for operating said main circuit breaker upon a greater predetermined intensity of said condition of the transformer.

JOHN K. HODNETTE.